United States Patent [19]
Kanezawa

[11] Patent Number: 5,717,476
[45] Date of Patent: Feb. 10, 1998

[54] LIQUID CRYSTAL DISPLAY DEVICE AND MANFACTURING METHOD THEREFOR

[75] Inventor: Tatsuo Kanezawa, Suwa, Japan

[73] Assignee: Seiko Epson Corporation, Tokyo, Japan

[21] Appl. No.: 584,599

[22] Filed: Jan. 11, 1996

[30] Foreign Application Priority Data

Jan. 13, 1995 [JP] Japan .................................. 7-004482
Nov. 16, 1995 [JP] Japan .................................. 7-298275

[51] Int. Cl.⁶ .................... G02F 1/1333; G02F 1/1345
[52] U.S. Cl. .................... 349/149; 349/60; 349/150; 349/151; 349/152
[58] Field of Search .................... 359/80, 81, 88; 349/60, 149–152

[56] References Cited

U.S. PATENT DOCUMENTS

| | | | |
|---|---|---|---|
| 4,466,701 | 8/1984 | Ogata et al. | 359/88 |
| 5,042,919 | 8/1991 | Yabu et al. | 359/88 |
| 5,067,796 | 11/1991 | Suzuki et al. | 359/88 |
| 5,100,695 | 3/1992 | Kawakami et al. | 427/96 |
| 5,187,604 | 2/1993 | Taniguchi et al. | 359/88 |
| 5,317,438 | 5/1994 | Suzuki et al. | 359/88 |
| 5,406,164 | 4/1995 | Okawa et al. | 310/88 |
| 5,467,210 | 11/1995 | Kishigami | 359/88 |
| 5,556,670 | 9/1996 | Mihara et al. | 359/80 |

*Primary Examiner*—William L. Sikes
*Assistant Examiner*—Julie Ngo
*Attorney, Agent, or Firm*—Eric B. Janofsky; W. Glen Johnson

[57] ABSTRACT

In a liquid crystal display device, support columns are formed on the outside of a seal area in an edge area of opposing substrates, thus reducing substrate deformation and preventing the occurrence of air bubbles inside the liquid crystal layer, undesirable coloring of the display area, and color irregularity. Support columns 9 formed using a conductive ink are provided on the outside of seal material 6 used for sealing liquid crystal layer 5 contained between top substrate 1 and bottom substrate 2. The support columns 9 prevent the warping of substrates 1 and 2 caused by the shrinkage of mold material 8 during hardening, reducing the changes in the liquid crystal layer thickness. Support columns 9 are print-formed simultaneously with the conductive connection area of the liquid crystal panel, and are hardened simultaneously with the seal material.

36 Claims, 7 Drawing Sheets

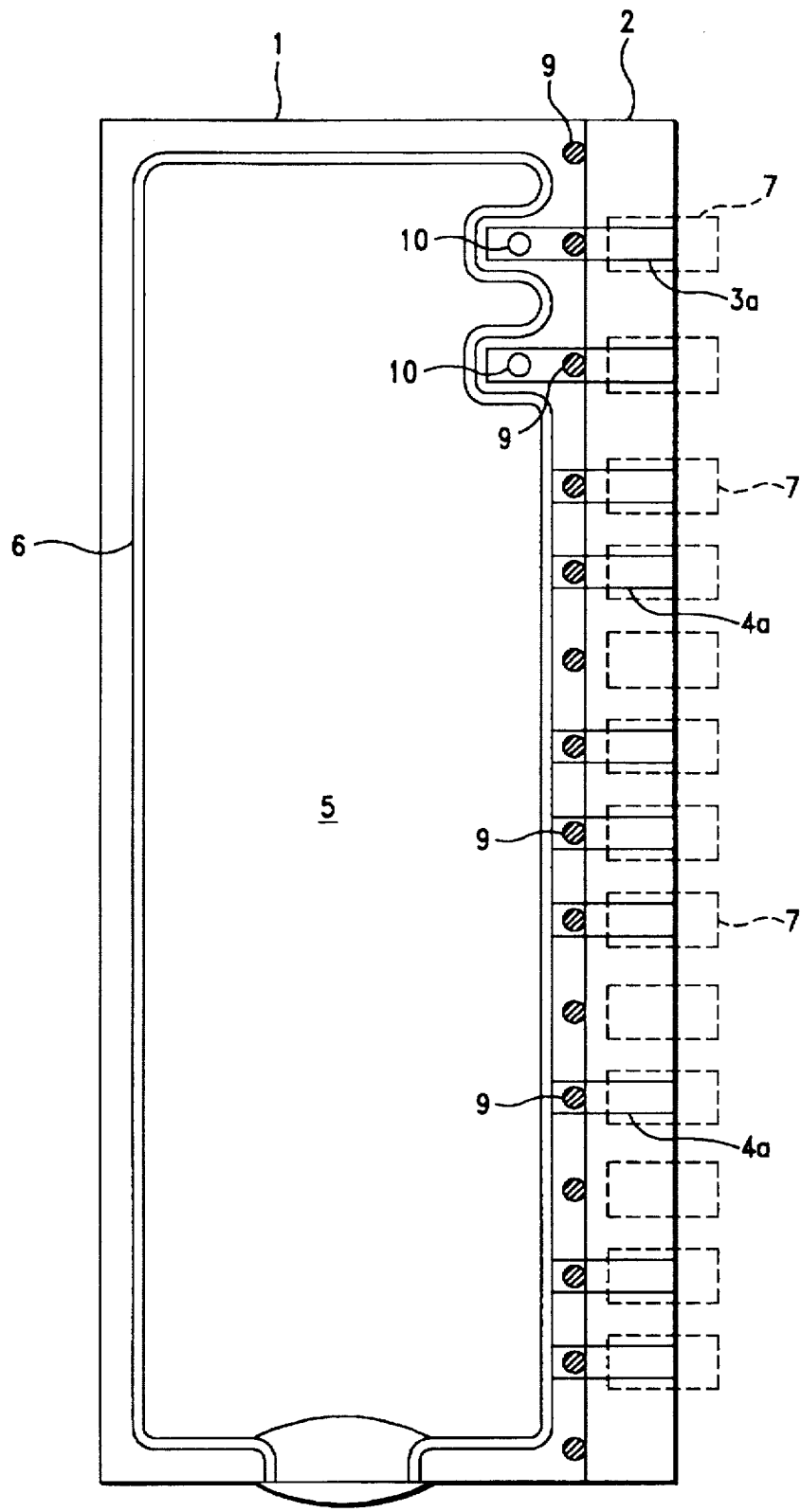
FIG.—2

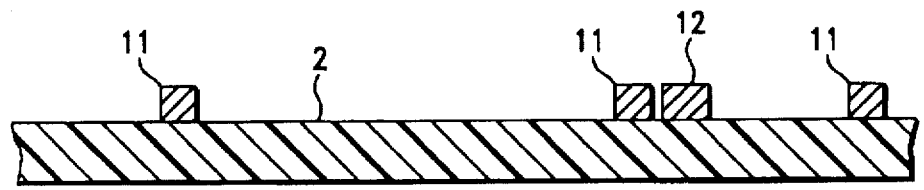
FIG.—4A
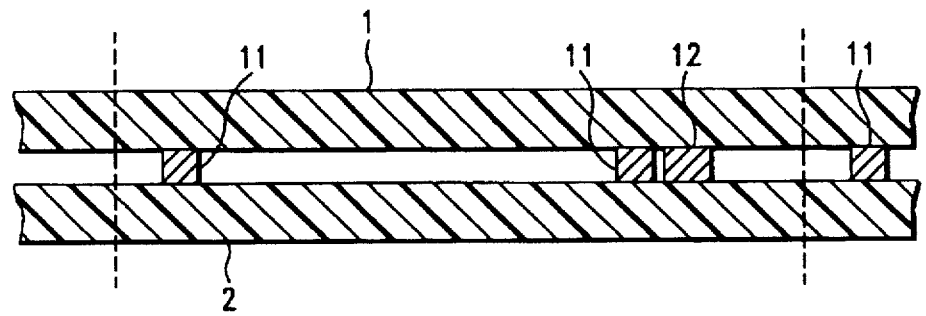
FIG.—4B
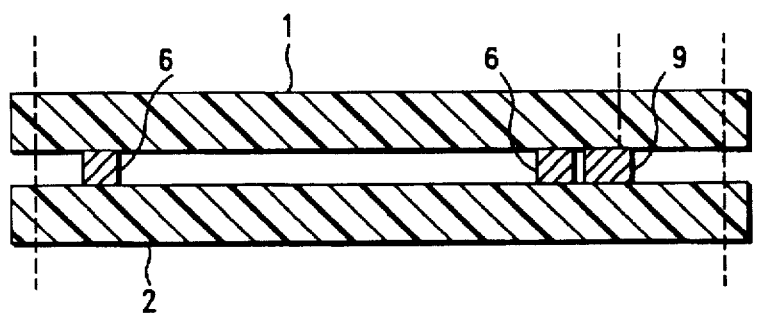
FIG.—4C
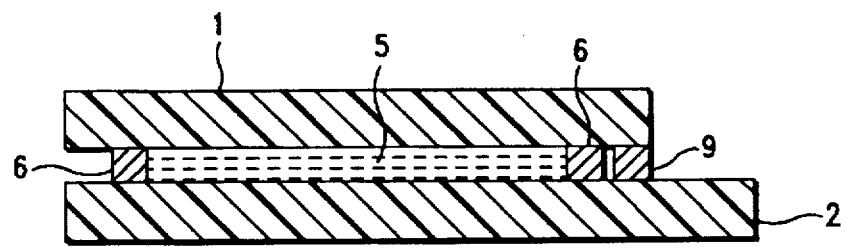
FIG.—4D

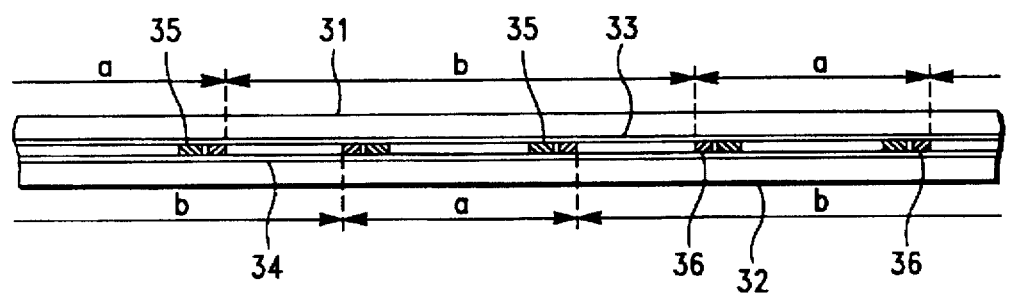
FIG.—5A
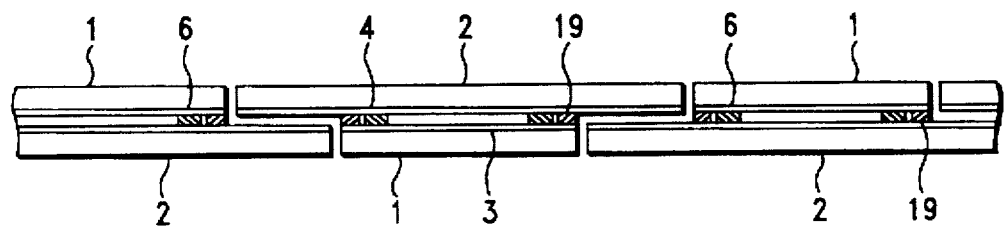
FIG.—5B
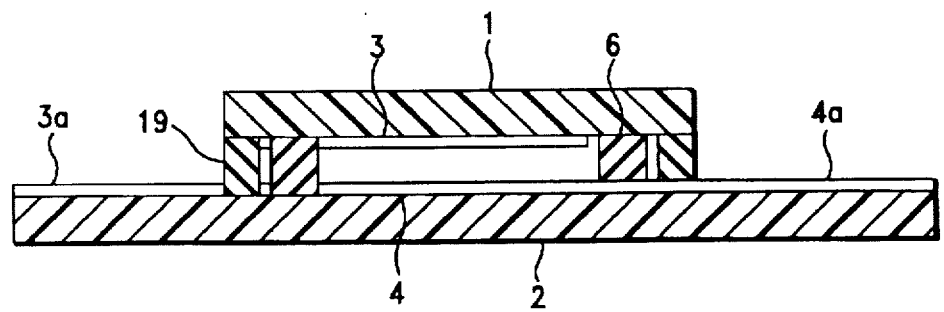
FIG.—5C
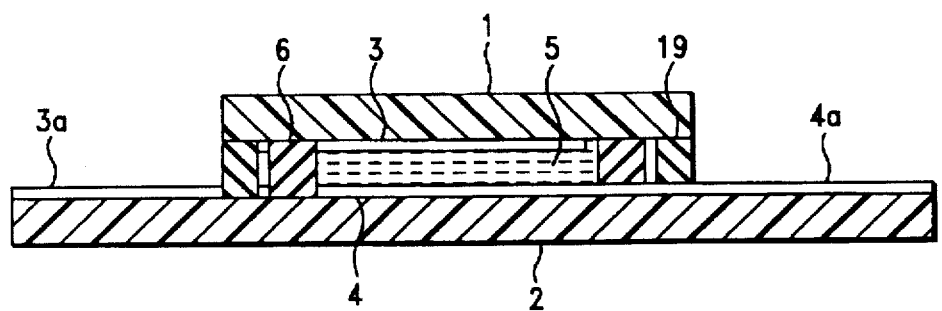
FIG.—5D

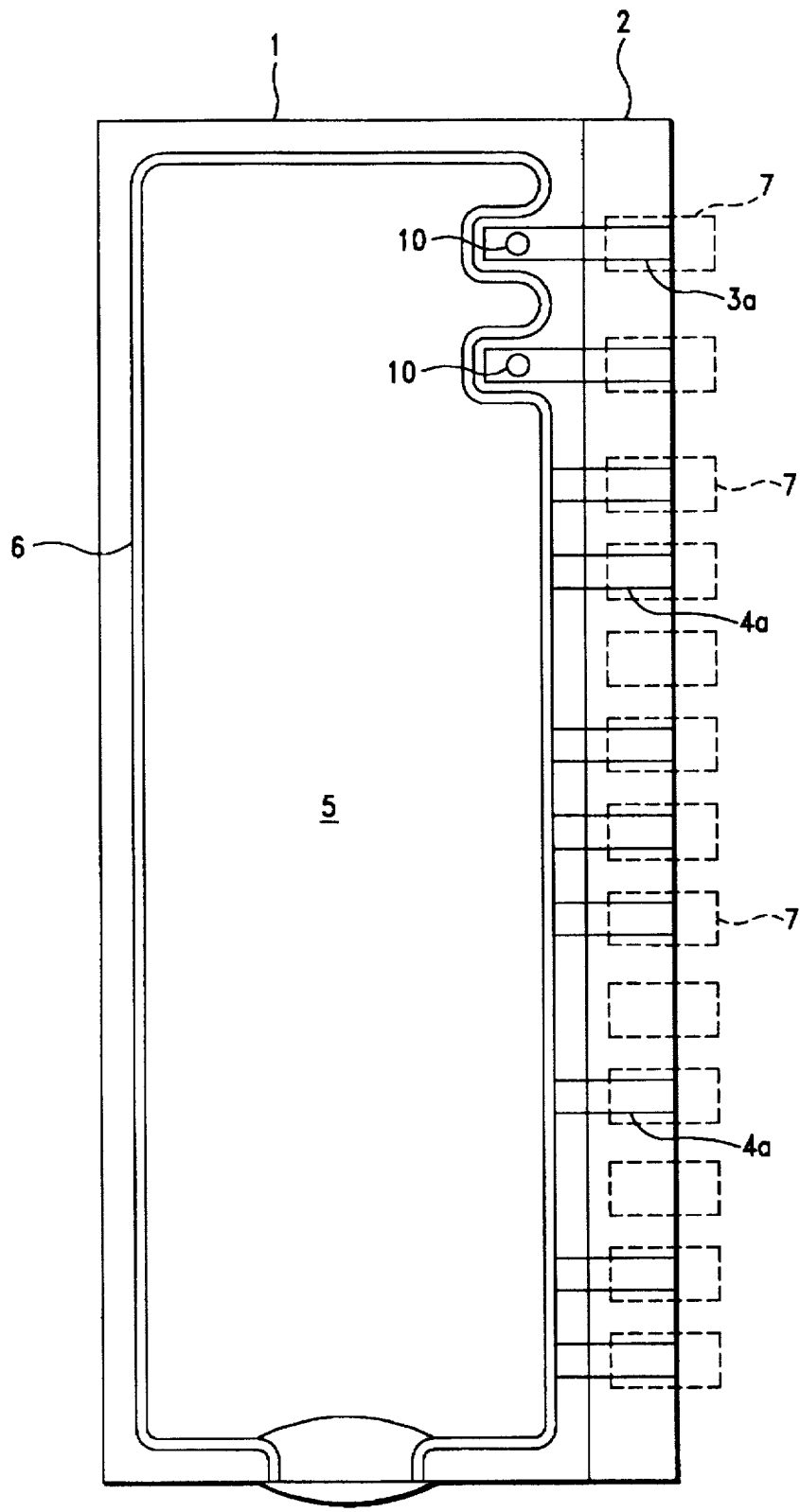
FIG.—8
(PRIOR ART)

LIQUID CRYSTAL DISPLAY DEVICE AND MANFACTURING METHOD THEREFOR

BACKGROUND OF THE INVENTION

1. Field of the Invention

The invention relates to a liquid crystal display device, and more particularly to technologies for enhancing the structure of the peripheral area of the substrate of a liquid crystal display.

2. Description of the Related Art

In conventional liquid crystal display devices, the sealing of a liquid crystal layer between two substrates, and the application of voltage between the electrodes formed in pairs on the back side of the liquid crystal layer change the orientation of the liquid crystals inside the layer, making it possible to display various images. FIG. 7 depicts an example of an enlarged cross-sectional view of the substrate edge area of a convention liquid crystal display devices, and FIG. 8 is a perspective view from above showing the overall configuration.

As shown therein, both the top and bottom substrates 1, 2 are constituted by clear glass plates, and transparent electrodes 3 and 4 are formed in specified patterns on the opposing internal surfaces of substrates 1 and 2. Liquid crystal layer 5 is sealed between top substrate 1 and bottom substrate 2 by means of sealant 6.

Bottom substrate 2 extends farther out to one side than top substrate 1, and electrode pads 4a, which are conductively connected to clear electrode 4, constitute external electrodes are formed on this surface. Insertion pins 7, installed such that they clamp bottom substrate 2, contact these electrode pads 4a and connect to an external wiring substrate, or the like. Insertion pins 7 with legs are attached to substrate 2 by means of elastic jaws 7a and 7b, such that they clamp onto bottom substrate 2; and these installation areas are secured with molding material 8.

Multiple electrode pads 4a are positioned at a specified minimum interval on the edge area of bottom substrate 2, and are connected to transparent electrodes 4 formed on the interior surface of bottom substrate 2. On the other hand, as shown in FIG. 8, multiple electrode pads 3a are also formed on the edge area of bottom substrate 2, and are connected via conductive connection area 10 to transparent electrodes 3 formed on the interior surface of top substrate 1. The above device is, for example, a segment-type liquid crystal display device, and transparent electrodes 3 and 4 are used as common electrodes and segment electrodes, respectively.

Such conventional devices have numerous drawbacks problems and has a disadvantage for example in the above-mentioned conventional liquid crystal display device, it is necessary to fill and coat the gap between top substrate 1 and bottom substrate 2 with resin molding material 8 in order to secure the area where electrode pads 3a and 4a and insertion pins 7 with legs are conductively connected, and to prevent electrolytic corrosion of electrode pad 4a, in the electrode lead-out area where bottom substrate 2 extends outward beyond the edge area of top substrate 1. This kind of coating is also used in making a conductive connection for the pad areas of a circuit board via bonding wires, and in making a conductive connection using a conductive adhesive in the edge area of a flexible substrate and heat seal, in addition to the conductive connection that is made via insertion pins 7 with legs as described above.

The reasons for using a resin mold for coating include the following: to electrically coat the connections of the various components connected to the above-mentioned insertion pins 7 with legs, bonding wires, flexible substrates, heat seal, etc. (conductive connection area protection mold); to secure flexible substrates and the heat seal, etc. and to increase their rigidity (reinforcement mold); to prevent electrolytic corrosion caused by the potential difference between electrode pads resulting from the adhesion of a liquid such as water to two or more adjacent electrode pads 3a and 4a (anti-corrosion mold); and to prevent corrosion and erosion of other structural areas of a liquid crystal panel (durability and corrosion resistance enhancement mold).

As explained above, this kind of mold is often applied to the conductive connection area where electrode pads 3a and 4a are formed. However, the type of reinforcement and durability mold described above is necessarily applied to areas other than conductive connection areas. Therefore, resin coating using a mold agent is sometimes applied to the entire perimeter of a liquid crystal panel.

When such a mold, or coating, is applied, the hardening and shrinking of the mold resin usually pulls the edges of the top and bottom substrates closer, deforming them inward. As a reaction to this phenomenon, the space between the top and bottom substrates becomes wider toward the middle of sealing material 6, causing negative pressure inside, and as a result, low-temperature air bubbles and shock air bubbles tend to occur inside the liquid crystal layer.

Furthermore, the stress accompanying the resin coating changes the cell thickness of the liquid crystal panel, and tends to produce coloring and color irregularity. This cell thickness change tends to be particularly large near the seal area, and it may become necessary to apply a black mask to the perimeter of the liquid crystal panel in order to avoid display quality degradation in this area. Because the formation of this mask reduces the liquid crystal display area, it increases the overall cost of manufacturing a liquid crystal display. The above-mentioned coloring and color irregularity become particularly serious problems in large-size liquid crystal panels since cell thickness may vary widely within the panel surface.

The cause of the stress that brings about the above-mentioned substrate deformation is not limited to shrinkage-induced stress, and may include such factors as mechanical contacts made during liquid crystal panel manufacturing or during the incorporation of the liquid crystal panel into various instruments, and shock or vibration applied to the various instruments into which the liquid crystal panel is incorporated.

OBJECTS OF THE INVENTION

Therefore, it is the object of the present invention to solve the above-mentioned problems and provide a new structure for a liquid crystal display device, that can prevent substrate deformation by dispersing the stress applied to the substrates.

It is another object of the present invention to improve the display quality of liquid crystal display devices by reducing dimensional errors in the liquid crystal cell structure caused by external stress.

It is a further object of the present invention to improve product yield by preventing quality degradation of liquid crystal display devices due to mold formation.

It is a still further object of the present invention to achieve a method that does not require any special design change or addition of manufacturing steps in order to prevent substrate deformation caused by mold formation.

SUMMARY OF THE INVENTION

As a means of solving the above-mentioned problems, the liquid crystal display device of the invention is provided with two substrates at least one of which is transparent, a liquid crystal layer contained between the substrates, a seal area formed between the substrates to surround the liquid crystal layer, and support columns for connecting the substrates on the outside of the seal area. The liquid crystal layer can be based on any display principle, and the seal area and the support columns are not limited to any particular materials. Furthermore, any number of support columns can be used, and they can be formed in any shape.

According to this means, the formation of the support columns on the outside of the seal area reduces substrate deformation that may be caused by various elements that use the seal area as the fulcrum. Therefore, it is possible to reduce the occurrence of air bubbles inside the liquid crystal layer, as well as undesirable coloring of the display area, and color irregularity.

When a mold material for covering the edge areas of the substrates is provided, the support columns resist the compression force of the mold material, thus reducing the stress applied to the substrates and providing the effect of suppressing substrate deformation. The mold materials include a type for fastening connection components, e.g., connection pins and connection wires, that are conductively connected to the external pins used for applying an electrical field to the liquid crystal layer; a type for reinforcing the flexible substrate that is conductively connected to the external pins used for applying an electrical field to said liquid crystal layer; and a type for preventing electrolytic corrosion of said external pins.

In these cases, the support columns should preferably be formed at the edges of the substrates. The support columns formed at the edges of substrates offer the greatest resistance to the stress applied to the edges of the substrates.

Furthermore, the support columns should preferably be formed using the conductive paste used for making a conductive connection among the wires inside the device. When the support columns are formed using the conductive paste, the support columns can be formed simultaneously with the conductive connection areas (in particular, the top and bottom connection areas for connecting the conductive elements formed along the substrates that sandwich the liquid crystal cells) inside the liquid crystal panel, or the support columns can be used as the conductive connection area. In this way, manufacturing costs can be reduced without any changes in the number of processes or the process contents.

Additionally, the conductive paste should preferably be a conductive ink containing carbon. When a conductive ink containing carbon is used, the support column can easily and precisely be formed using a printing method.

Furthermore, the support columns should preferably be formed using a material containing a phenol resin as the main ingredient, in which case their adhesion to the substrates is relatively weak and they possess an appropriate degree of flexibility. This facilitates the cutting of the substrates which is performed during the manufacture of the liquid crystal display device, and avoids the risk of cracking the substrates when they are cut at the areas where the support columns have been formed.

Additionally, the support columns should preferably be formed using a material possessing weaker adhesion strength than the material comprising the seal area. This facilitates the cutting of the substrates which is performed during the manufacture of the liquid crystal display device, and avoids the risk of cracking the substrates when they are cut at the areas where the support columns have been formed.

Furthermore, the support columns should preferably be formed using a material possessing the same hardening characteristics as the material comprising the seal area. When the support columns are formed using a material that possesses the same hardening characteristics as the material comprising the seal area, the support columns can be hardened simultaneously with the seal area during the manufacture of the liquid crystal display device. Therefore, unlike in a case in which the support columns and the seal area are separately hardened, the substrate positioning accuracy used for hardening the seal area can also be used for the support columns, thus avoiding increases in the number of manufacturing steps and the process time.

Additionally, according to the manufacturing method of the liquid crystal display device, a seal area is formed between two substrates at least one of which is transparent, to surround the area that houses the liquid crystal layer, and after the support columns for connecting the substrates on the outside of the seal area are formed, the edges of said substrates are covered by a mold material. In this manufacturing method, the above-mentioned effects can be easily obtained simply by providing the support columns.

Note that the seal area and the support columns should preferably be formed using materials possessing the same hardening characteristics, and the seal area and the support columns should preferably be hardened at the same time. The seal area and the support columns can be hardened simultaneously if they are formed using materials possessing the same hardening characteristics, e.g., thermohardening or photo-curing characteristics, thus eliminating the need for a new hardening process.

Furthermore, the conductive connection areas that connect electrodes formed on the substrates with external pins should preferably be formed simultaneously with the support columns using the same material. The support columns and the conductive connection areas can be positioned and formed using a single process if they are formed using the same material, thus eliminating the need for a new manufacturing process for positioning and forming the support columns, and the above-mentioned effects can be obtained by merely changing the formation pattern of the conductive connection areas.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 2 is a top perspective view of the first embodiment;

FIGS. 4A–4D are process diagrams showing a first embodiment of a manufacturing method of the liquid crystal display device in accordance with the present invention;

FIG. 5A–5D are process diagrams showing a second embodiment of the manufacturing method of the liquid crystal display device in accordance with the present invention;

FIG. 8 is a top perspective view of a conventional liquid crystal display device.

DESCRIPTION OF THE PREFERRED EMBODIMENTS

Next, the embodiments of the invention will be explained with references to the drawings. The liquid crystal display device of the invention can be applied to various types of liquid crystal display devices, including known liquid crystal display devices such as the TN type, the STN type, and the GH type; those used for the relatively small display areas of watches and calculators; and high-capacity types used for personal computer displays and small-size TVs.

First Embodiment

Figure 1:
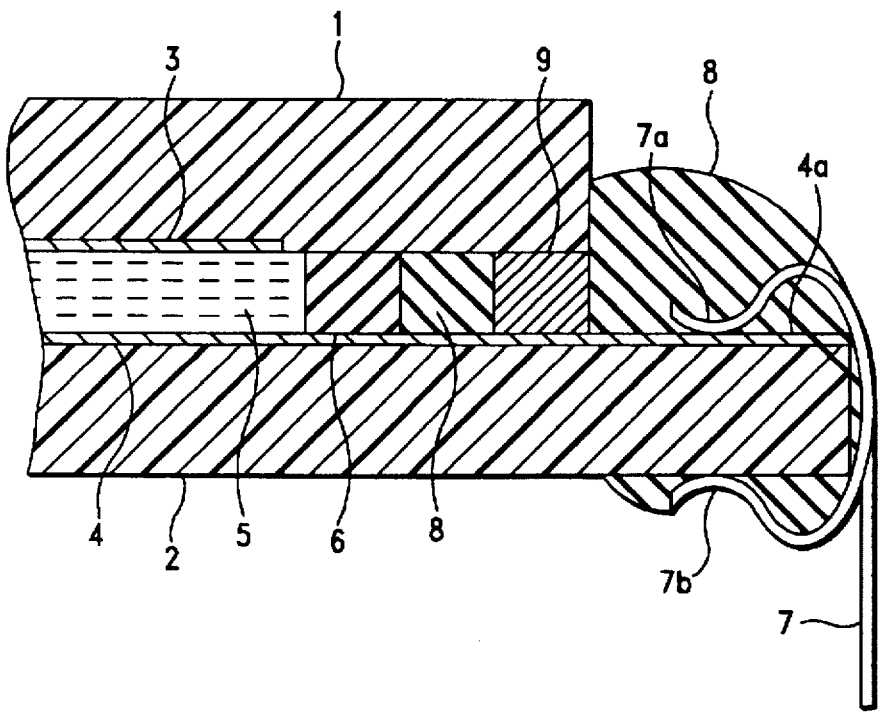
FIG. 1 is an enlarged partial cross-sectional view of a first embodiment of the liquid crystal display device in accordance with the present invention.

FIG. 1 shows an enlarged partial cross-sectional view of the first embodiment of the liquid crystal display device related to the invention. In this embodiment, the liquid crystal display device is provided with top substrate 1 formed in the same way as the conventional example described above, bottom substrate 2, transparent electrodes 3 and 4, Liquid crystal layer 5, seal material 6, and electrode pads 4a. Insertion pins 7 with legs are installed on electrode pads 4a of bottom substrate 2 and are then fastened with molding material 8. Depending on the liquid crystal display method, a polarizing plate may be positioned on the outside of the top and bottom substrates.

In this embodiment, support columns 9 formed using a conductive ink containing carbon particles are formed between the edges of top substrate 1 and bottom substrate 2. As will be explained below, these support columns 9 are formed simultaneously with the assembly of the top and bottom substrates before mold material 8 is supplied.

FIG. 2 is a top perspective view of the first embodiment. As shown therein liquid crystal layer 5 is sealed between top substrate 1 and bottom substrate 2 by seal material 6. Transparent electrodes 4 (shown in FIG. 1) formed in a specified pattern on bottom substrate 2 are conductively connected to electrode pads 4a formed on the surface of the edge area of bottom substrate 2. Transparent electrodes 3 (not shown in the figure) formed in a specified pattern on the inside surface of top substrate 1 are conductively connected to electrode pads 3a formed on bottom substrate 2, via top-bottom connection areas 10 comprising a conductive (carbon) ink.

Electrode pads 3a and 4a are conductively connected to an exterior structure such as a printed circuit board via insertion pins 7 having respective legs. Note that the support columns 9 are formed at a specified spacing between the right edge area of top substrate 1 and bottom substrate 2, to provide sufficient support between the edges of top substrate 1 and bottom substrate 2.

Support columns 9 are formed to provide support between the edge area of top substrate 1 and bottom substrate 2, as a result they should preferably be spaced evenly where necessary as in the area described above. Although support columns 9 are formed only on the right edge in this embodiment, they can be formed on one or more other edges if necessary.

By virtue of support columns 9 being formed using a conductive ink in this embodiment, it is possible to utilize them as conductive connection areas, like top-bottom connection areas 10, if the circuit configuration allows. For example, it is possible to use support columns 9 to connect electrodes 3 formed on the inside surface of top substrate 1 to electrode pads 3a formed in the right edge area of bottom substrate 2, in place of or in addition to top-bottom connection areas 10.

In the first embodiment, support columns 9 are formed in locations that match the sparing of electrode pads 3a and 4a. However, as evident from the fact that some support columns 9 are formed in areas where no electrode pads exist, the locations of support columns 9 are not limited to areas on top of electrode pads, and support columns 9 can be formed in any location. However, when using a conductive material for support columns 9, care must be taken to prevent support columns 9 from providing a conductive path among adjacent electrode pads. This can be accomplished by making the diameter of support columns 9 smaller than the electrode pad spacing. However, a simpler method is to form support columns 9 on top of electrode pads as in the first embodiment.

As will be appreciated by one of, instead of forming support columns 9 possessing circular cross-sections as in the first embodiment, it is possible to form them such that they possess elongated rectangular cross-sections along the edge of the substrate. However, when forming support columns 9 in the electrode pad formation locations as in this embodiment, they must be formed using an insulating material, or insulators must be used between the support columns and the electrode pads to prevent shorting of the adjacent electrode pads.

Furthermore, although support columns 9 should preferably be formed on the edge area of top substrate 1 as in the embodiment in order to increase their resistance to stress, they can provide a similar effect as long as they are located outside of seal material 6.

The preferred material for the support columns in this embodiment is the above-mentioned conductive ink. Conductive powder such as carbon powder is mixed in with an appropriate hardening element, and a phenol resin, for example, is used as the hardening element. Because this conductive ink is the same material as that used in the conductive connection area and can be formed in the same process, it is superior in terms of ease of manufacturing and cost reduction. Furthermore, because the phenol resin has weak adhesion strength and is relatively soft, it facilitates the cutting of the substrates during manufacturing and can prevent the substrates from cracking during the cutting operation.

In addition to the above-mentioned conductive ink, various types of conductive pastes, such as silver solder, can be used as the conductive material comprising the support columns. However, the material of the support columns related to this invention need not be conductive, and can be insulating. The material of the support columns should preferably be a type that can be positioned in a semi-fluid state and can then be hardened, in order to make the selective positioning of the support columns easy. For example, thermohardening or photo-curing resin can also be used.

In terms of required characteristics, the support columns should at least possess sufficient support strength after hardening, and need not adhere to the substrates. Actually, it is preferable that the adhesion be weak for the following reason. Because the support columns are formed on the substrate edge, the desired level of adhesion strength will not interfere with the cutting of the substrates as explained below. If the adhesion is strong, cutting the substrates across the areas where the support columns are adhered becomes difficult. Furthermore, even if cutting can be performed, it will not be possible to separate the substrates, thus posing the risk of damaging the substrate edges. Adhesion strength is related to the shrinkage rate during hardening, and the material of the support columns should preferably be weak in adhesion and low in shrinkage rate sin order to suppress substrate deformation and warpage.

Second Embodiment

Figure 3:
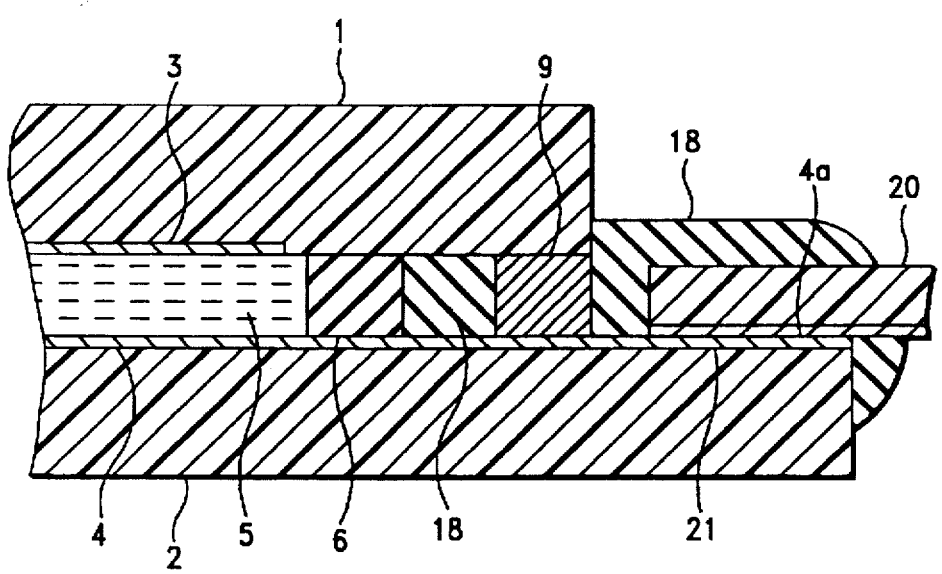
FIG. 3 is an enlarged partial cross-sectional view of a second embodiment of the liquid crystal display device in accordance with the present invention.

FIG. 3 shows the second embodiment of the liquid crystal display device related to the invention. In the second embodiment, top substrate 1, bottom substrate 2, transparent electrodes 3 and 4, electrode pads 4a, liquid crystal layer 5, seal material 6, and support columns 9 are identical to those in the above embodiment, and thus their explanations are omitted.

Figure 6:
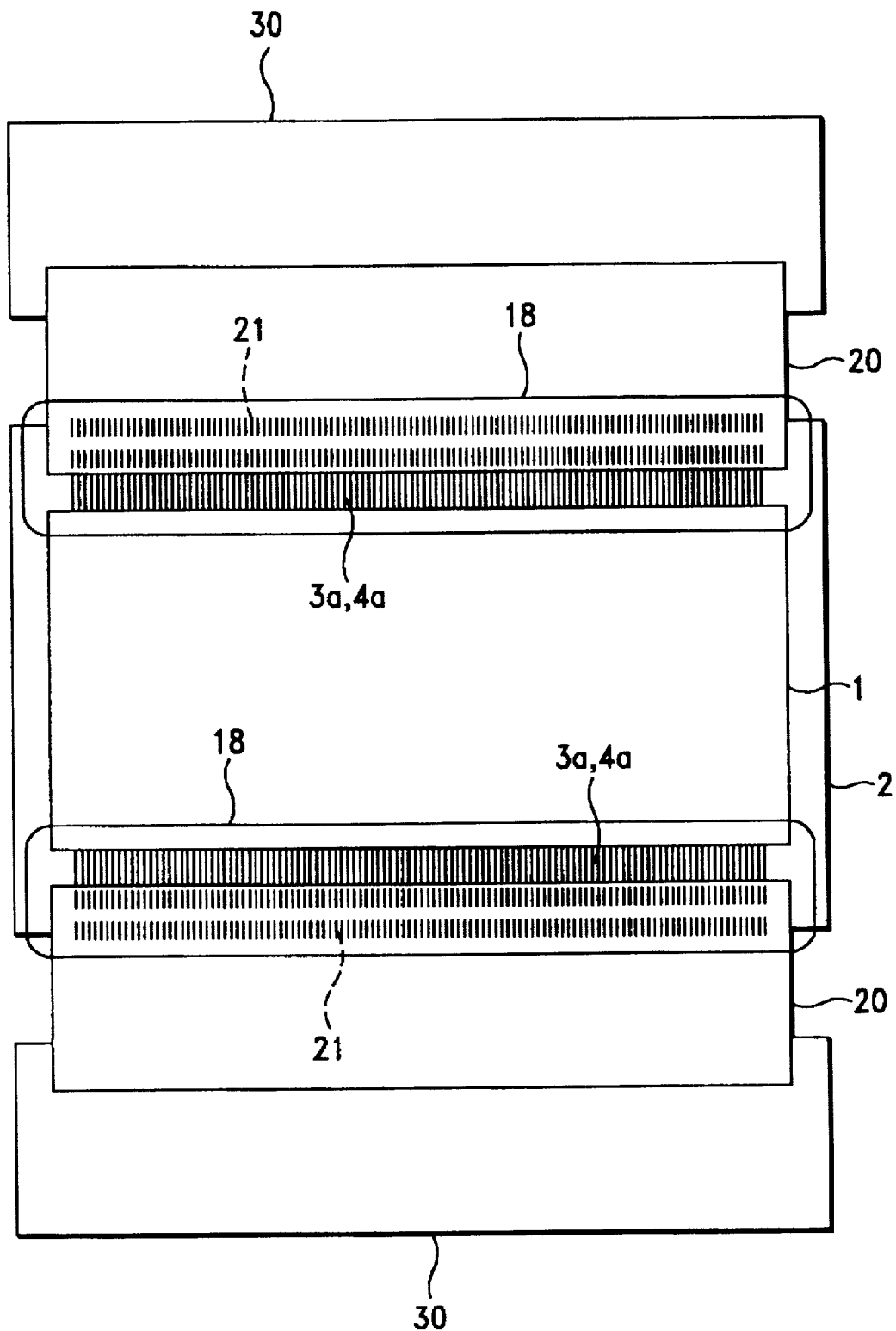
FIG. 6 is a top view showing the assembly structure of the liquid crystal display device formed according to the second embodiment of the manufacturing method.
Figure 7:
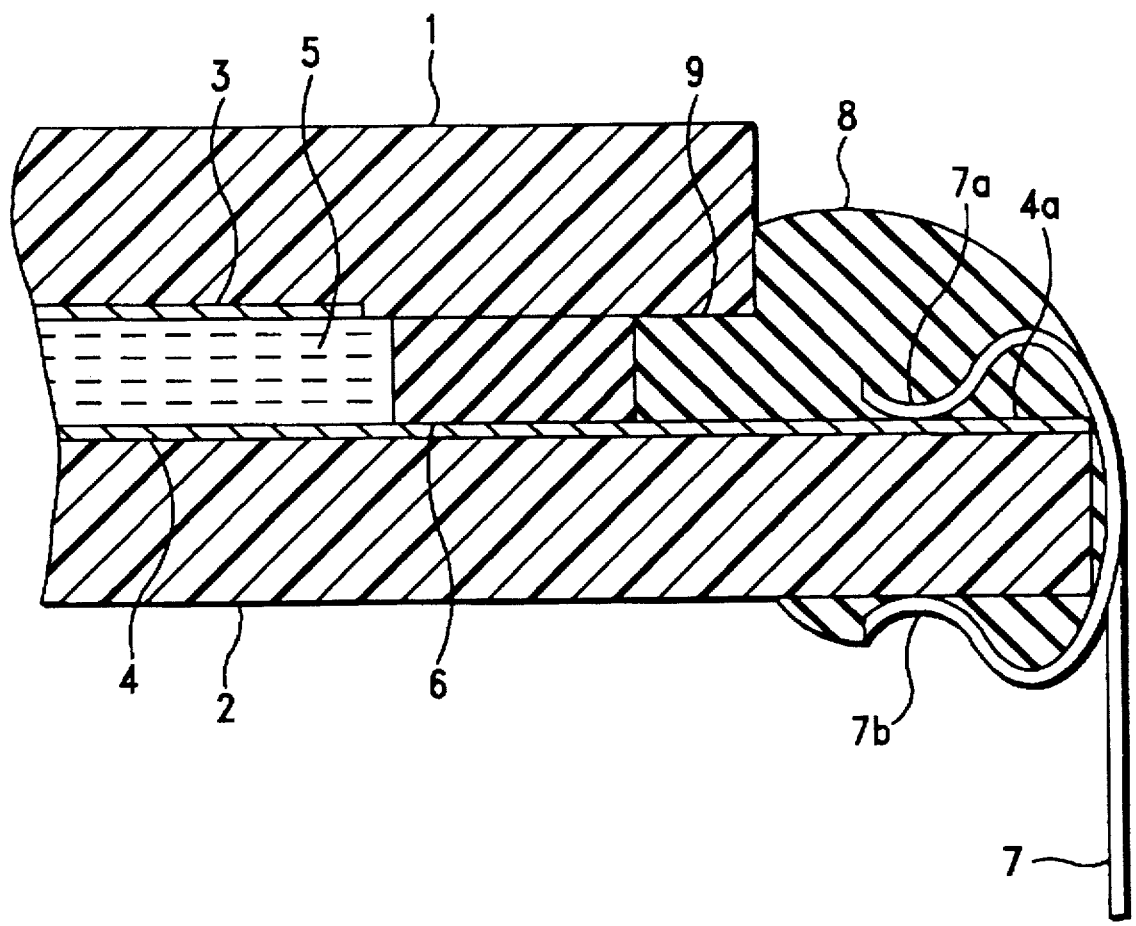
FIG. 7 is an enlarged partial cross-sectional view of a conventional liquid crystal display device.

In this embodiment, heat seal 20 is adhered to the top of multiple and parallel electrode pads 3a (connected to transparent electrode 3; FIG. 6) and 4a. In heat seal 20, wiring pads 21 are formed on the bottom of a thin flexible resin sheet at the same pitch as that of electrode pads 3a and 4a, and an anisotropic conductive layer (not shown in the figure) is adhered to the surface of wiring pads 21. This anisotropic conductive layer is produced by dispersing conductive particles in a thermohardening resin, for example, and adhesion with appropriate heating and pressurization can produce conductivity in the adhesion direction only.

Electrode pads 3a and 4a can be conductively connected to wiring pads 21 by applying a specified level of pressure and heat after the wiring pads 21 are formed on the surface of heat seal 20. Electrode pads 3a and 4a are then contacted. Then, mold material 18 is used for sealing to reinforce the connection area of heat seal 20 and to cover electrode pads 3a and 4a.

In the second embodiment, as in the first embodiment, the edge area of top substrate 1 has a tendency to be pulled toward bottom substrate 2 by the shrinking force of mold material 18, and thereby potentially deforming top substrate 1. However, because the edge area of top substrate 1 is supported by support columns 9, the deformation of top substrate 1 is suppressed. In the second embodiment, because mold material 18 is intended to reinforce the connection area of heat seal 20, it must preferably possess high levels of adhesion strength and hardness after hardening. In this example mold material extends between seal material 6 and support columns 9. However, such a material will also have a high shrinkage rate during hardening, which will apply a larger stress to the substrate edge during the hardening of the mold material, thus making the formation of support columns 9 even more effective in this case.

FIGS. 4A–4D show the first embodiment of the manufacturing method of the liquid crystal display device related to the invention. As shown in FIG. 4A, a pattern of transparent electrodes not shown in the figure is formed on transparent glass substrate 2, and then sealant 11 is coated onto the area corresponding to the perimeter of the liquid crystal display area. Conductive ink 12 is then selectively placed on the surface of bottom substrate 2 using screen printing. This conductive ink 12 is placed in the positions of necessary conductive connection areas (for example, top-bottom connection areas 10 in FIG. 2), and in multiple locations along sealant 11 on the outside of the liquid crystal display area.

Next, as shown in FIG. 4B, top substrate 1 is placed on top of sealant 11 and conductive ink 12, and top substrate 1 and bottom substrate 2 are secured by a specialized jig to maintain a specified gap (for example, several to dozens of mm). The substrates along with the specialized jig are heated to 150°–200° C. in an oven, simultaneously thermohardening sealant 11 and conductive ink 12, and thus forming seal material 6 and support columns 9.

Furthermore, as shown in FIG. 4C, the top and bottom substrates are cut and separated for each liquid crystal display area, and top substrate 1 is cut as shown in FIG. 4D to form the external pin area. If the adhesion of support columns 9 to top substrate 1 is too strong during the cutting of top substrate 1, support columns 9 may protrude into the cutting line, making the cutting operation difficult, or the cutting line may weave around support columns 9. The reason for this is as follows. In a low-cost coating method using printing, it is difficult to precisely control the amount of conductive ink 12; and it is even more difficult to do so given the gap between the substrates during the substrate alignment operation. Therefore, it is unrealistic to try to control the diameters of support columns 9 and the degree of protrusion into the planned cutting line.

However, in this embodiment, the adhesion strength of support columns 9, which are made of a conductive ink containing a phenol resin, is relatively weak, and is much weaker than that of sealant 11. As a result, top substrate 1 can be cut without any problem even if the conductive ink protrudes past the planned substrate edge line.

Insertion pins 7 with legs shown in FIG. 1 are then inserted into the liquid crystal panel thus formed, mold material 8 consisting of a UV-hardening resin is coated on top of the external pin area and is hardened through light irradiation. During this operation, mold material 8 may shrink as it hardens. Even so, because support columns 9 have been formed between the edge area of top substrate 1 and bottom substrate 2, the shrinking force is absorbed by support columns 9, thus reducing the stress applied to the substrates and preventing substrate deformation.

When a liquid crystal panel is produced without injecting liquid crystals into the gap between top substrate 1 and bottom substrate 2, the substrate gap expands by a maximum of approximately 1 mm in a conventional liquid crystal panel. In contrast, in this embodiment, expansion of the substrate gap was nearly nonexistent. When liquid crystals were actually injected in a conventional liquid crystal panel, the substrate gap is expanded by approximately 0.2–0.5 mm. In contrast, in the first embodiment, expansion of the substrate gap was at most 0.1 mm, drastically improving product yield. For example, in the case of TNT—(Twisted Nematic) type liquid crystal display devices, even changes of 0.2–0.5 mm in the substrate gap cause problems in product quality because coloring and color irregularity clearly occur when the change in the substrate gap exceeds 1 min. In the case of STN—(Super Twisted Nematic) type liquid crystal display devices, even changes of around 0.1 mm in substrate gap affect color tone. Therefore, display quality problems have occurred in TN-type liquid crystals, and in particular, fatal defects have occurred in STN-type liquid crystals in the past. However, the invention has succeeded in drastically improving display quality.

Next, the second embodiment of the manufacturing method of the liquid crystal display device related to the invention will be explained with references to FIG. 5A–5D. In this embodiment, transparent electrodes and internal surface structures 33 and 34, such as polarizing film, are formed in the interior surfaces of two transparent substrates 31 and 32 as shown in FIG. 5A. As surface structures 33 and 34, common electrodes are formed in area a, segment electrodes are formed in the center of area b, and electrode pads are formed on both edge areas of the segment electrodes. As shown in the figure, area a and area b are alternately formed on the interior surfaces of transparent substrates 31 and 32; furthermore, area a formed on the interior surface of transparent substrate 31 corresponds to area b formed on the interior surface of transparent substrate 32, and area b formed on the interior surface of transparent substrate 31 corresponds to area a formed on the interior surface of transparent substrate 32.

Next, sealant 35 formed to enclose the liquid crystal containment area and phenol resin 36 formed on the outside of said sealant 35 are sandwiched between the two substrates which are maintained at a specified gap by a jig, etc. From this state, the substrates are heated to harden sealant 35 and phenol resin 36.

When the transparent substrates 31 and 32 of the continuous panel thus configured is then cut into individual limits defined by said areas a and b, a liquid crystal is thus formed that uses the area corresponding to area a as the top substrate (smaller substrate) 1 and the area corresponding to area b as the bottom substrate (larger substrate) 2, as shown in FIG. 5B.

In this liquid crystal cell, as shown in FIG. 5C, extended areas of bottom substrate 2 exist on both sides of both edge areas of top substrate 1; and electrode pads 3a and 4a similar to those in the first embodiment are formed in these extended areas. Electrode pads 3a and 4a are connected to transparent electrode 3, i.e., the common electrode, and transparent electrode 4, i.e., the segment electrode, respectively, formed in the interior surfaces of top substrate 1 and bottom substrate 2.

The liquid crystal cell thus configured forms the liquid crystal display shown in FIG. 5D when liquid crystals are introduced into the area surrounded by thermohardened seal material 6 and support columns 19 on the outside.

In this liquid crystal display, bottom substrate 2 extends past both edge areas of top substrate 1, and electrode pads 3a and 4a which act as external pins are formed in these extended areas. Support columns 19 are formed on the outside of seal materials 6 which face these external pins on both sides. Because the support columns 19 are made of an insulating phenol resin, they can be formed in any size or at any position regardless of the formation positions of electrode pads 3a and 4a. In this embodiment, transparent substrates 31 and 32 are preferably cut near the formation locations of support columns 19. However, the transparent substrates can be separated without any problem even if support columns 19 protrude into adjacent areas because of weak adhesion of support columns 19 to the transparent substrates.

According to this second embodiment of the manufacturing method, a printing or coating process for forming insulating support columns 19 must be incorporated. Since support columns 19 become insulating members, they offer the benefit of being able to be formed in the optimal locations and shapes for preventing deformation of the substrates of the liquid crystal display, without being limited by the relative positions of the electrode pads. The above-mentioned structure in which areas a and b are alternately repeated is preferable for mass-production of liquid crystal display devices, and is effective in achieving cost reduction.

FIG. 6 shows an example in which the above-mentioned liquid crystal display is connected via a flexible substrate (heat seal) 20 to circuit board 30 on which a liquid crystal drive circuit is mounted. The edge area of heat seal 20 is placed on top of electrode pads 3a and 4a formed on the external pin area of the liquid crystal display, and is then adhered via an anisotropic conductive adhesive layer to wiring pad 21 formed on the bottom surface of heat seal 20 (back side in the figure) by applying heat and pressure. Mold material 18 fastens the tip area of heat seal 20 adhered on top of electrode pads 3a and 4a to the liquid crystal display, and is used for reinforcing the connection area.

As demonstrated by the various types of embodiments explained above, and as understandable to one skilled in the art to which the invention belongs, the invention can be used in a broad range of applications regardless of the connection structure of the external pin area of the liquid crystal display, the liquid crystal cell structure, or the area covered by the mold material.

Although the covering of the external pin area with a mold material was chiefly explained in each of the above embodiments, the invention is not limited to such cases and can be applied to various types of liquid crystal display devices, providing the superior effects of preventing changes in the substrate gap due to various types of external forces.

As explained above, the invention provides the following effects.

In accordance with an aspect of the present invention, formation of the support columns on the outside of the seal area reduces the substrate deformation that may be caused by the various elements that use the seal area as the fulcrum. Therefore, it is possible to reduce the occurrence of air bubbles inside the liquid crystal layer, as well as undesirable coloring of display area, and color irregularity caused by the changes in the substrate gap.

Additionally, the invention is effective in suppressing substrate deformation because the support columns support the shrinking force of the mold material, thus reducing the stress applied to the substrates.

Moreover in accordance with a further aspect of the present invention, the support columns formed on the edge area of the substrates provide the largest resistance to the stress applied to the edge area of the substrates.

Furthermore, in accordance with another aspect of the present invention, by using a conductive paste for forming the support columns, the support columns can be formed simultaneously with the conductive connection areas (in particular, the top and bottom connection areas for connecting the conductive elements formed along the substrates that sandwich the liquid crystal cells) inside the liquid crystal panel, or the support columns can be used as the conductive connection area, and thus manufacturing costs can be reduced without any change in the number of processes or the process contents.

In accordance with an additional aspect of the present invention, by using a conductive ink containing carbon, the support column can be easily and precisely formed using a printing method.

In accordance with still a further aspect of the present invention, by using a material containing a phenol resin as the main ingredient for forming the support columns, the adhesion of the support columns to the substrates is relatively weak and the support columns possess an appropriate degree of flexibility, thus facilitating the cutting of the substrates which is performed during the manufacture of the liquid crystal display device, and avoiding the risk of cracking the substrates when they are cut at the areas where the support columns have been formed.

In accordance with still another aspect of the present invention, the use of a material that possesses weaker adhesion strength than the material comprising the seal area for forming the support columns, facilitates the cutting of the substrates which is performed during the manufacture of the liquid crystal display device and avoids the risk of cracking the substrates when they are cut at the areas where the support columns have been formed.

In accordance with still an additional aspect of the present invention, by using a material that possesses the same hardening characteristics as the material comprising the seal area for forming the support columns, the support columns can be hardened simultaneously with the seal area during the manufacture of the liquid crystal display device. Thus, unlike in a case in which the support columns and the seal area are separately hardened, the substrate positioning accuracy used for hardening of the seal area can also be used for the support columns, avoiding increases in the number of manufacturing steps and the process time.

Moreover, the above-mentioned effects can be easily obtained simply by providing the support columns.

In accordance with yet an additional aspect of the present invention, by using materials possessing the same hardening characteristics, e.g., thermohardening or photo-curing characteristics, for forming both the seal area and the support columns, the need for a new hardening process is eliminated because said seal area and said support columns can be hardened at the same time.

In accordance with yet a further aspect of the present invention, by forming the support columns simultaneously with and using the same material as the conductive connection areas, the support columns and said conductive connection areas can be positioned and formed using a single process, thus eliminating the need for a new manufacturing process for positioning and forming the support columns, and the above-mentioned effects can be obtained by merely changing the formation pattern of the conductive connection areas.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

Reference Numerals

1: Top substrate
2: Bottom substrate
3, 4: Transparent electrodes
3a, 4a: Electrode pads
5: Liquid crystal layer
6: Seal material
7: Insertion pin with leg
8,18: Mold materials
9,19: Support columns
10: Conductive connection area
11: Sealant
12: Conductive
20: Heat seal

What is claimed is:

1. A liquid crystal display, comprising:

opposing first and second substrates defining a gap therebetween for sandwiching a liquid crystal medium, said first substrate including a plurality of external terminals formed an edge portion thereof, the gap having a predetermined length;

a molding member disposed on said edge portion of said first substrate and contacting a corresponding edge portion of said second substrate;

a sealing member interposing said first and second substrates for encapsulating said liquid crystal medium; and a plurality of support members disposed external to said sealing member and proximate said molding member, each said support member substantially spanning the gap between said first and second substrate for maintaining the predetermined gap length in the presence of compressive force applied to said edge portions of said first and second substrates.

2. The liquid crystal display of claim 1, further comprising an external connection member electrically connected to said plurality of external terminals.

3. The liquid crystal display of claim 2, wherein said external connection member comprises a flexible substrate.

4. The liquid crystal display of claim 2, wherein said external connection member comprises a plurality of external pins.

5. The liquid crystal display of claim 1, wherein said support members comprise a phenol resin.

6. The liquid crystal display of claim 1, wherein said sealing member comprises a first material having a first adhesion strength; and wherein each said support member comprise a second material having a second adhesion strength weaker than the first adhesion strength.

7. The liquid crystal display of claim 1, wherein said sealing member comprises a first material having a first cure rate; and wherein each said support member comprises a second material having a second cure rate substantially equal to the first cure rate.

8. The liquid crystal display of claim 1, wherein said molding member applies the compressive force to said edge portions of said first and second substrates.

9. The liquid crystal display of claim 1, further comprising a conductive connector formed between the first and second substrates to provide an electrical pathway between electrodes formed on said first and second substrates.

10. The liquid crystal display of claim 9, wherein said conductive connector comprises a conductive paste, and wherein said plurality of support members essentially comprise the conductive paste.

11. The liquid crystal display of claim 9, wherein said conductive connector comprises a conductive paste including a conductive ink containing carbon.

12. A method for manufacturing a liquid crystal display device encapsulating a liquid crystal medium between opposing first and second substrates, comprising the steps of:

forming a sealing member on the first substrate for surrounding the liquid crystal medium;

forming a plurality of support members on the first substrate proximate an edge portion thereof and external to the sealing member;

arranging the second substrate on the sealing member and the plurality of support members; and forming a molding member between the first and second substrates proximate the plurality of support members.

13. The method for manufacturing a liquid crystal display device of claim 12, further comprising the step of forming a conductive connector for providing an electrical connection among electrodes disposed on the first and second substrates.

14. The method for manufacturing a liquid crystal display device of claim 12, wherein the sealing member and the support members exhibit substantially equal cure rates and are formed substantially simultaneously.

15. The method for manufacturing a liquid crystal display device of claim 14, further comprising the step of forming a conductive connector for connecting electrodes formed on one of said first and second substrates with external terminals formed on the remaining one of said first and second substrates simultaneously with said plurality of support members forming step, wherein the plurality of support members and conductive connector together comprise a first conductive material.

16. A liquid crystal display, comprising:
opposing first and second substrates defining a gap therebetween for internally sandwiching a liquid crystal layer, each said first and second substrates having a perimeter edge portion, the gap having a predetermined length;
a molding member disposed on and between said edge portions of said first substrate and second substrates for protecting said edge portions;
a sealing member interposing said first and second substrates for encapsulating said liquid crystal medium; and
a plurality of support members disposed external to said sealing member and proximate said molding member, each said support member substantially spanning the gap between said first and second substrate for maintaining the predetermined gap length in the presence of compressive force applied to said edge portions of said first and second substrates by said molding member.

17. The liquid crystal display of claim 16, further comprising:
a plurality of external terminals formed at said edge portion of said first substrate; and
an external connection member electrically connected to said external terminals for applying an electrical field to said liquid crystal layer.

18. The liquid crystal display of claim 17, wherein said external connection member comprises a flexible substrate.

19. The liquid crystal display of claim 17, wherein said external connection member comprises a plurality of external pins.

20. The liquid crystal display of claim 17, wherein said molding member fastens connection components electrically connected to external connection member.

21. The liquid crystal display of claim 16, wherein said plurality of support members comprise a phenol resin.

22. The liquid crystal display of claim 16, wherein
said sealing member comprises a first material having a first adhesion strength; and
wherein each said support member comprise a second material having a second adhesion strength weaker than the first adhesion strength.

23. The liquid crystal display of claim 16, wherein
said sealing member comprises a first material having a first cure rate; and
wherein each said support member comprises a second material having a second cure rate substantially equal to the first cure rate.

24. The liquid crystal display of claim 16, further comprising a conductive connector formed between the first and second substrates to provide an electrical pathway between electrodes formed on said first and second substrates.

25. The liquid crystal display of claim 24, wherein said conductive connector comprises a conductive paste, and wherein said plurality of support members essentially comprise the conductive paste.

26. The liquid crystal display of claim 24, wherein said conductive connector comprises a conductive paste including a conductive ink containing carbon.

27. A liquid crystal display, comprising:
opposing first and second substrates defining a gap therebetween for internally sandwiching a liquid crystal layer, each said first and second substrates having a perimeter edge portion, the gap having a predetermined length;
a molding member disposed on and between said edge portions of said first substrate and second substrates;
a sealing member interposing said first and second substrates for encapsulating said liquid crystal medium;
a plurality of support members disposed external to said sealing member and proximate molding member, each said support member substantially spanning the gap between said first and second substrate for maintaining the predetermined gap length in the presence of compressive force applied to said edge portions of said first and second substrates; and
a conductive connector formed between said first and second substrate electrically connecting electrodes formed on respective interior surfaces of said first and second substrates.

28. The liquid crystal display of claim 27, wherein said conductive connector and said plurality of support members all essentially comprise a conductive paste.

29. The liquid crystal display of claim 28, further comprising a plurality external terminals formed on an edge portion of said first substrate.

30. The liquid crystal display of claim 29, further comprising an external connection member electrically connected to said plurality of external terminals.

31. The liquid crystal display of claim 30, wherein said external connection member comprises a flexible substrate.

32. The liquid crystal display of claim 30, wherein said external connection member comprises a plurality of external pins.

33. A liquid crystal display, comprising:
opposing first and second substrates defining a gap therebetween for sandwiching a liquid crystal medium, said first substrate including a plurality of external terminals formed an edge portion thereof, the gap having a predetermined length;
a sealing member interposing said first and second substrates encapsulating said liquid crystal medium;
a molding member disposed on said edge portion of said first substrate externally from said sealing member and over said terminals, said molding member contacting a corresponding edge portion of said second substrate; and
a plurality of support members dispersed within said molding member external to said sealing member.

34. The liquid crystal display of claim 33, wherein said support members are disposed sporadically within said molding member.

35. The liquid crystal display of claim 33, wherein said support members are uniformly dispersed within said molding member.

36. A liquid crystal display, comprising:

a first substrate including a substantially planar face and a peripheral edge, said edge comprising a plurality of external terminals extending therefrom;

a liquid crystal medium disposed on said planar face of said first substrate;

a sealing member disposed on said planar face of said first substrate circumscribing said liquid crystal medium;

a second substrate disposed on said sealing member substantially parallel to and separated a predetermined gap length from said planar face of said first substrate to encapsulate said liquid crystal medium;

a molding member disposed on said edge of said first substrate external to said sealing member and proximate said terminals, said molding member extending into contact with said second substrate; and a plurality of support members dispersed within said molding member between said first and second substrates and spanning the predetermined gap length.

* * * * *

UNITED STATES PATENT AND TRADEMARK OFFICE
CERTIFICATE OF CORRECTION

PATENT NO.   : 5,717,476
DATED        : February 10, 1998
INVENTOR(S)  : Tatsuo Kanezawa It is certified that error appears in the above-identified patent and that said Letters Patent is hereby corrected as shown below:

On the title page, item [54] and column 1, line 3, "THEREFOR" should read --THEREOF--

Signed and Sealed this

Ninth Day of June, 1998

Attest:

BRUCE LEHMAN

*Attesting Officer*                *Commissioner of Patents and Trademarks*